United States Patent [19]
Schilling

[11] Patent Number: 6,077,888
[45] Date of Patent: Jun. 20, 2000

[54] HIGH VISCOSITY CATIONIC SLOW-SET AND MEDIUM-SET EMULSIONS

[75] Inventor: Peter Schilling, Charleston, S.C.

[73] Assignee: Westvaco Corporation, New York, N.Y.

[21] Appl. No.: 09/231,064

[22] Filed: Jan. 14, 1999

Related U.S. Application Data

[63] Continuation-in-part of application No. 09/082,463, Jan. 7, 1998, abandoned, which is a continuation-in-part of application No. 08/837,270, Apr. 11, 1997, abandoned.

[51] Int. Cl.[7] .............................. C08K 5/13; B01D 21/01
[52] U.S. Cl. ..................... 524/76; 106/273.1; 106/277; 516/113; 516/116
[58] Field of Search ................................ 252/311, 311.5; 106/277, 273.1; 524/72, 76; 516/113, 116

[56] References Cited

U.S. PATENT DOCUMENTS

| | | |
|---|---|---|
| 3,032,507 | 5/1962 | Wright . |
| 3,126,350 | 3/1964 | Borgfeldt . |
| 3,220,953 | 11/1965 | Borgfeldt . |
| 3,423,221 | 1/1969 | Borgfeldt . |
| 3,466,247 | 9/1969 | Ohtsuka et al. . |
| 3,718,639 | 2/1973 | Falkehag et al. . |
| 3,764,359 | 10/1973 | Dybalski . |
| 3,867,162 | 2/1975 | Elste, Jr. . |
| 3,957,524 | 5/1976 | Doughty et al. . |
| 4,017,419 | 4/1977 | Ludwig et al. . |
| 4,450,011 | 5/1984 | Schilling et al. . |
| 4,775,744 | 10/1988 | Schilling et al. . |
| 4,810,299 | 3/1989 | Schilling et al. . |
| 4,877,457 | 10/1989 | Schilling et al. . |
| 5,328,505 | 7/1994 | Schilling . |

OTHER PUBLICATIONS

Dobozy, O. Ungarische Akademie der Wissenschaften, Arbeitgruppe für StraBenbau and Verkehrswesen Budapest: Einiges öber neuartige kationaktive Pitumen–Emulsionen. In: Fette, Seifen, Anstrichmittel, vol. 68, p. 982 (1966).

*Primary Examiner*—Nathan M. Nutter
*Attorney, Agent, or Firm*—Daniel B. Reece IV; Terry B. McDaniels; Richard L. Schmalz

[57] ABSTRACT

This invention relates to improved bituminous emulsions, specifically to cationic medium-set and slow-set mixing grade emulsions. More particularly, it relates to emulsifying compositions which can be used to produce bituminous emulsions exhibiting high viscosity and low asphalt residues. The emulsifying compositions are combinations of fatty amine and/or polyamine, lignin, and nonionic surfactant. A preferred emulsifying composition can be produced by reacting the combinations of fatty amine and/or polyamine, lignin, and nonionic surfactant with formaldehyde.

21 Claims, No Drawings

HIGH VISCOSITY CATIONIC SLOW-SET AND MEDIUM-SET EMULSIONS

This application is a continuation-in-part of our commonly assigned, co-pending U.S. patent application Ser. No. 09/082,463 filed Jan. 7, 1998, entitled "High Viscosity Cationic Slow-Set and Medium-Set Emulsions" and now abandoned; which is a continuation-in-part of commonly assigned U.S. patent application Ser. No. 08/837,270, filed Apr. 11, 1997, entitled "High Viscosity Cationic Slow-Set and Medium-Set Emulsions", now abandoned.

FIELD OF INVENTION

This invention relates to improved bituminous emulsions, specifically to cationic medium-set and slow-set mixing grade emulsions. More particularly, it relates to emulsifying compositions which can be used to produce bituminous emulsions exhibiting high viscosity and low asphalt residues. The emulsifying compositions are combinations of fatty amine and/or polyamine, lignin, and nonionic surfactant. A preferred emulsifying composition can be produced by reacting the combinations of fatty amine and/or polyamine, lignin, and nonionic surfactant with formaldehyde.

DESCRIPTION OF THE PRIOR ART

Cationic slow-set emulsions distinguish themselves from rapid-set emulsions by their ability to mix well with aggregates containing a high degree of fines such as stone dust. Because of their excellent wetting characteristics and penetrating power, aggregate mixes with uniform coatings are obtained. In contrast to $C_{12}$–$C_{18}$ monoalkyl amine hydrochlorides and corresponding alkyldiammonium propane hydrochlorides (which are rapid-set emulsifiers that produce emulsions that are very unstable in the presence of negatively charged aggregates), quaternary $C_{12}$–$C_{18}$ alkyl- or alkylaryl-ammonium or diammonium salts bearing one or two positive charges produce emulsions with excellent stability and mixing characteristics. The usefulness of these substances was disclosed in U.S. Pat. No. 3,032,507 to Wright, in U.S. Pat. No. 3,220,953 to Borgfeldt, in U.S. Pat. No. 3,867,162 to Elste, in U.S. Pat. No. 3,764,359 to Dybalski, in U.S. Pat. No. 3,957,524 to Doughty, and in U.S. Pat. No. 3,466,247 to Ohtuska. Akyl pyridinium emulsifiers are described by Dobozy in a 1966 edition of the magazine "Fette, Seifen, Anstrichsmittel" (Volume 68, page 982). The reaction of alkali lignin with primary and secondary amines and formaldehyde for the preparation as a cationic emulsifier for bitumen has been disclosed in U.S. Pat. No. 3,126,350 to Borgfeldt, while the reaction products of lignin with a tertiary amine-epichlorohydrine intermediate is described in U.S. Pat. No. 3,718,639 to Falkehag et al. Reaction products of lignin or lignosulfonates with polyethylene amines (either by the way of the Mannich reaction with formaldehyde in aqueous solution or without formaldehyde in nonaqueous medium at 150° C. and above) are disclosed in U.S. Pat. No. 4,017,419 to Ludwig, in U.S. Pat. No. 4,775,744 to Schilling, and in U.S. Pat. No. 5,328,505 to Schilling. A reaction product pine wood resin acid and tetraethylene pentamine is disclosed in U.S. Pat. No. 3,423,221 to Borgfeldt. A reaction product of polyamines and sulfonated carboxylic acids is disclosed in U.S. Pat. No. 4,450,011 to Schilling et al. Lignin derivative reaction products of lignin with an aldehyde (or an aldehyde-producing substance) and a polyamine are disclosed in U.S. Pat. No. 4,775,744 to Schilling et al. A reaction product of modified polyamine with certain polycarboxylic acids and anhydrides are disclosed in U.S. Pat. No. 4,810,299 to Schilling et al.; while U.S. Pat. No. 4,877,457 to Schilling et al. discloses an emulsifier obtained by reacting a sugar-containing syrup with a modified polyamine and certain polycarboxylic acids and anhydrides.

Generally, cationic emulsions prepared with fatty amines, fatty diamines, or fatty amidoamines produce asphalt emulsions which break rapidly when contacted with siliceous or calcareous aggregate, thereby resulting in an increasing degree of stiffness and unworkability of the mix with aggregate. To overcome this problem, it has been common practice to use cutback asphalt (instead of asphalt cement) for medium-set mixing-grade asphalt emulsions. Although cutback emulsions prepared with these emulsifiers also break when mixed with the aggregate, the solvent (such as naphtha, diesel oil, or kerosene) decreases the viscosity of the asphalt and increases the workability of the asphalt/aggregate mix. After placement of the mixes, the solvent evaporates and the final stiff aggregate asphalt matrix is obtained. However, the escalating costs of solvents coupled with environmental efforts to reduce pollution by lowering VOC's have stimulated the asphalt industry's search for suitable viscosifiers for cationic mixing-grade emulsions which do not require the inclusion of solvents.

The application of slow-set emulsifiers produces emulsions which are stable when mixed with aggregate and do not produce stiff mixes. Increased workability is achieved by using slow-set emulsions. The use of solvent in medium-set emulsions also functions as a rheology modifier imparting thixotropic character into emulsions, which allows one to deposit thick asphalt emulsion coats without run off. In contrast to this behavior, solventless cationic slow-set emulsions are fairly low in viscosity and tend to run-off the coated aggregate surfaces (especially when the fines content is low). Aggregate coated with slow-set emulsions exhibit thin asphalt films after the coats have dried by evaporation of water.

Therefore, it is the object of this invention to provide an improved emulsifying composition for use in solventless slow-set and medium-set bituminous emulsions which produce emulsions exhibiting improved viscosity while also maintaining excellent aggregate mixing stabilities.

Another object of this invention is to provide an improved method for enhancing emulsion viscosity in solventless slow-set and medium-set bituminous emulsions.

SUMMARY OF THE INVENTION

The objects of this invention are met by utilizing an improved emulsifying composition to prepare cationic bituminous emulsions. These enhanced emulsifying compositions are produced by blending lignin and nonionic surfactants with fatty amines and/or polyamines. Further enhanced emulsifying compositions are produced via reacting the emulsifying blend with formaldehyde.

These emulsifying compositions are effective in producing medium-set and slow-set mixing grade cationic bituminous emulsions which are suitable for use without the addition of hydrocarbon solvents. The improved bituminous emulsions produced maintain excellent aggregate mixing stabilities. Moreover, these bituminous emulsions exhibit low asphalt residues and high viscosities (which allows the preparation of suitable emulsions at lower bitumen to water ratios).

Finally, utilization of the enhanced emulsifying compositions resulted in a totally unexpected and beneficial result.

Generally kraft lignin precipitates at pH of 7 and lower when no surfactant is present. However, in combination with sufficient nonylphenol ethoxylate (exhibiting a polyethylene oxide chain prepared by the condensation of 30 to 100 moles ethylene oxide per mole of nonylphenol) lignin stays in solution and forms a homogenous soap solution at low pH. The same is true for combinations of these components plus certain fatty amines and/or polyamines. Such amines and polyamines are able to replace nonylphenol ethoxylate, and clear solutions of lignin at low pH values are obtained when these surfactants are present (see Table III below).

DESCRIPTION OF THE PREFERRED EMBODIMENTS

The enhanced emulsifying compositions which are effective in producing medium-set and slow-set mixing grade cationic bituminous emulsions are blends (prepared at pH levels greater than about 10) of:

A) 100 parts by weight of lignin,

B) 75 to 200 parts by weight of nonionic surfactants, and

C) 20 to 100 parts by weight of fatty amine selected from the group consisting of N-alkyl amines, N-alkyl-propane diamine-1.3, N-alkyl-N'-propyl amino-propane diamine-1.3, N-alkyl-N',N'-bis-propyl amino-propane diamine-1.3, N-alkyl-N,N',N'-tri-propyl amino-propane diamine-1.3, and combinations thereof.

It should be noted that the term "amine", as used herein, includes polyamines.

Preferred emulsifying compositions are produced by reacting the above-noted emulsifying blend with 1.5 to 9.0 parts by total weight of the reactants of formaldehyde.

An improved method for enhancing emulsion viscosity in solventless slow-set and medium-set cationic bituminous emulsions can be practiced by adding to the emulsion a blend (prepared at pH levels greater than about 10) of:

A) 100 parts by weight of lignin,

B) 75 to 200 parts by weight of nonionic surfactants, and

C) 20 to 100 parts by weight of fatty amine selected from the group consisting of N-alkyl amines, N-alkyl-propane diamine-1.3, N-alkyl-N'-propyl amino-propane diamine-1.3, N-alkyl-N',N'-bis-propyl amino-propane diamine 1.3, N-alkyl-N,N',N'-tri-propyl amino-propane diamine-1.3, and combinations thereof.

A preferred method for enhancing emulsion viscosity can be practiced by adding to the emulsion an emulsifying composition produced by reacting the above-noted blend with 1.5 to 9.0 parts by weight of formaldehyde.

Lignin, one of the main constituents of the emulsifying compositions formulation, is a polymeric substance containing a hydroxy phenyl propane backbone. It is found in plant and vegetable tissue associated with cellulose or other plant constituents. In the pulp and paper industry, lignin-containing material such as wood, straw, corn stalks bagasse and other suitable plant tissue are processed to recover the cellulose and pulp. The residual pulping liquors are the main sources of technical lignins. While there are some differences in the chemical structures depending on the species from which the lignin is obtained and the pulping condition at which it is removed from the cellulose, the basic structures of the various lignins are similar as long as the kraft process is used to deliver the cellulose. Any lignin may be used which is soluble at high pH value, and at low pH value after being combined with a suitable nonionic surfactant at high pH value and acidified. In the sulfite pulping process cellulose is separated from lignin by introduction of sulfonic acid functionalities into the lignin (a process resulting in water soluble lignins). Hydrolysis lignin obtained from the hydrolysis of lignocellulosic materials in the manufacture of wood sugar exhibits higher molecular weight and is water insoluble. Lignin is separated from the spent kraft liquor by acidification with a suitable acid such as sulfuric acid, acetic acid or carbon dioxide. A two step process is preferred, as it is advantageous to separate odoriferous and toxic byproducts such as hydrogen sulfide and methyl mercaptan as sodium salts (which are nearly odorless at pH values around 9–10).

Lignins which are particularly suitable for use in formulating the improved emulsifying compositions include: kraft soft wood lignin, kraft hardwood lignins, bagasse lignins, organosol lignins, desulfonated lignosulfonates, and combinations thereof.

Nonionic surfactants which are suitable for use in formulating the improved emulsifying compositions include, but are not limited to, the following: nonylphenol ethoxylates exhibiting a chain length of 30 to 100 ethylene oxide units, linear $C_8$–$C_{18}$ ethoxylated fatty alcohols, branched $C_8$–$C_{18}$ ethoxylated fatty alcohols, ethylene oxide propylene oxide block copolymers having a number average molecular weight in the range of about 1,000 to about 1 0,000, polyethoxylated tallow amines containing 5 to 50 ethylene oxide units per molecule, polyethoxylated tallow diamine containing 5 to 50 ethylene oxide units per molecule, and combinations thereof.

Tallow fatty acids, soya fatty acids, oleic fatty acids, and coconut fatty acids are excellent sources of fatty amines to be used in the invention composition. Specific fatty amines which are suitable for use in formulating the improved emulsifying compositions include, but are not limited to, the following: tallow amine, tallow diamine, soya diamine, tall oil diamine, tallow triamine, tallow tetramine, oleyl diamine, coco diamine, linear $C_8$–$C_{18}$ petroleum-derived diamine, branched $C_8$–$C_{18}$ petroleum-derived diamine, linear $C_{12}$–$C_{18}$ alkylether diamine, branched $C_2$–$C_{18}$ alkylether diamine, and combinations thereof. Suitable $C_{12}$–$C_{18}$ alkylether diamines may be produced from fatty alcohols via the addition of acrylonitrile and hydrogenation.

It is preferred that the employed amines contain alkyl groups having a chain length in the range of $C_8$ to $C_{22}$. They can be saturated in nature or contain single or multiple double bonds. Such compounds can be derived from petroleum based fatty acids or natural oils and fats (such as tallow, soya, oleic, tall oil, coconut, palm, vegetable, or fish).

To provide for a stable homogeneous emulsifier solution in the pH range of 1.5 to 3.5, a weight ratio of lignin to nonionic surfactants of about 1:0.75–1:2 has to be maintained. The preferred ratio is 1:1.5–1:1.75. A suitable amount of fatty amine based on the weight of lignin is in the range of about 20–100 parts per 100 parts of lignin.

The bituminous emulsifying compositions are generally prepared by slurrying lignin in water at a solids concentration between about 20% to about 25% and adjusting the pH to a level greater than 10, preferably in the range of about 10.5 to about 12.5 (usually with a mineral base such as sodium or potassium hydroxide). The cationic form of the emulsifying composition is obtained via dilution of the concentrate to the proper concentration and the addition of a suitable mineral or organic acid (such as diluted hydrochloric acid) until a pH between 1.5 and 3.5 is reached.

In preparing the improved bituminous emulsions of this invention, an aqueous acidic solution of the enhanced emulsifying compositions is intimately mixed with heated asphalt under high shear in a colloid mill or homogenizer. The bitumen content can range from about 30% to about 80% by total weight of the bituminous emulsion, preferably between 50% and 70%. The dosage of the emulsifying composition can range from 0.1–10%, preferably between 0.3%–1.5% by total weight of the bituminous emulsion. Depending upon the type of emulsifying composition employed, a mixing grade cationic emulsion is obtained in the pH range of 1–7, with an optimum performance at a pH of 1.5–4. If the pH is adjusted to a range of 7–12, an anionic mixing grade emulsion is obtained. In contrast to traditional mixing grade emulsions prepared with tallow quaternary ammonium salts, tallow diquaternary diammonium salt, or lignin amine hydrochloride/nonylphenol ethoxylate combinations, the emulsions prepared with the emulsifying compositions of this invention exhibit high viscosity (thereby allowing the preparation of suitable emulsions at a lower bitumen to water ratio).

The "bitumen" in the emulsion may be derived from domestic or foreign crude oil; and it also includes bitumen, natural asphalt, petroleum oil, paving grade oil residue, plastic residue from coal tar distillation, petroleum pitch, and asphalt cements diluted with solvents (cutback asphalt). Practically any viscosity and penetration graded asphalt cement for use in pavement construction as described in ASTM designation D-3381 and D-946 may be emulsified with the aid of the emulsifying compositions of this invention. The cationic soap solutions are generally obtained by dilution of the alkaline, high pH concentrate via the addition of a sufficient amount of a suitable acid (for instance hydrochloric, sulfuric, phosphoric, acetic acid or the like) until the desired pH value below 7 is reached and a clear emulsifier is obtained. Thereafter, the soap solution (which is preheated to 55° C.) and the fluid asphalt (which is preheated to 120–140° C.) are mixed under high shear in a colloid mill for 30 seconds to yield an asphalt emulsion of brown color and creamy texture. Prior to the testing according to ASTM D-244 the emulsions are stored at 60–70° C. for 16 hours. Aggregate mixing tests are performed by placing a weighed amount of aggregate and prewet water in a mixing bowl, mixing for 30 seconds, adding 5–10% emulsion by weight of the aggregate on top and further mixing for one to five minutes. The mix is subsequently divided into three equal parts. The first sample is set aside, the second sample is washed with water immediately after mixing; while the third sample is washed with water after it has been set aside for one hour.

The percent coating of the aggregate surface for each sample is estimated visually. The first sample is evaluated for the percent initial coating, the second sample for the percent initial washoff coating, and the third sample for the percent one-hour washoff coating. The construction industry coating requirements are 90% minimum, 50% maximum and 50% minimum, respectively.

The practice of this invention may be seen in the following examples wherein the preparation of various types of emulsifying composition formulations of the invention is described and wherein the advantages of using these compounds in cationic medium-setting and slow-setting bituminous emulsions are illustrated. The following examples are provided to further illustrate the present invention and are not to be construed as limiting the invention in any manner.

EXAMPLE 1

A series of enhanced emulsifying compositions were produced via the following method.

A three-necked reaction flask equipped with agitator, reflux condenser and thermometer was charged with 30 grams of kraft soft wood lignin in the form of a 30% slurry. Sufficient water was added to reduce the solids content of the slurry to about 20–25%. A sufficient amount of concentrated sodium hydroxide solution was then added to place the lignin into solution (i.e., when a pH in the range of about 10.5–11.5 was obtained). To the homogeneous sodium lignate solution was added from 30–60 grams of nonylphenol ethoxylate (exhibiting a chain length of from 30 to 100 ethylene oxide units) to produce lignin/nonylphenol ethoxylate mixtures.

Comparison emulsifiers were produced by adding enough water to the lignin/nonylphenol ethoxylate mixtures to adjust them to a 35–40% activity, at which time the mixtures were heated to 60° C. and held at this temperature for 2 hours. The resulting emulsifiers are hereafter referred to as E# 1–9.

To 75–90 grams (based on 100% activity) of the lignin/nonylphenol ethoxylate mixtures was added 2–30 grams of tallow diamine with sufficient water to dilute to the blends to about 35% activity. The blends were heated to 80° C. for two hours. The resulting enhanced emulsifying compositions are hereafter referred to as E# 10–20.

EXAMPLE 2

To 50–90 grams (based on 100% activity) of the lignin/nonylphenol ethoxylate mixtures produced in Example 1 was added from 2–30 grams of a $C_{12}$–$C_{18}$ alkylether diamine. These blends were diluted with water to about 35% solids and heated for two hours at 80° C. The resulting enhanced emulsifying compositions are hereafter referred to as E# 21–24.

EXAMPLE 3

To the emulsifying composition formulations described in examples 1 through 4, from 0.5 to 3 moles of formaldehyde (based on 1000 grams lignin in the formulations) are added at 60° C. and heated to 90° C. for two hours. The resulting emulsifying compositions are hereafter referred to as E# 25–36.

EXAMPLE 4

Enhanced emulsifying compositions may be produced by charging a three-necked reaction flask equipped with agitator, reflux condenser and thermometer with 30 grams of kraft soft wood lignin in the form of a 30% slurry. Sufficient water is added to reduce the solids content of the slurry to about 20–25%. A sufficient amount of concentrated sodium hydroxide solution is then added to place the lignin into solution (i.e., when a pH in the range of about 10.5–11.5 is obtained). To the homogeneous sodium lignate solution is added from 30–60 grams of nonylphenol ethoxylate (exhibiting a chain length of from 30 to 100 ethylene oxide units) to produce lignin/nonylphenol ethoxylate mixtures.

To 75–90 grams (based on 100% activity) of the lignin/nonylphenol ethoxylate mixtures is added 2–30 grams of a N-alkyl-N,N',N'-tri-propyl amino-propane diamine-1.3 with sufficient water to dilute to the blends to about 35% activity. The blends are heated to 80° C. for two hours to produce the emulsifying compositions.

Where desired, additional emulsifying compositions may be produced by reacting these emulsifying compositions with from 0.5 to 3 moles of formaldehyde (based on 1000 grams lignin in the formulations), which is added at 60° C. and heated to 90° C. for about two hours.

EXAMPLE 5

This example illustrates the invention methods utilizing the above-noted emulsifying compositions. Using Texaco AC-5 asphalt, emulsions were prepared at 50–65% asphalt residue at a pH of about 2.0. The emulsifying composition concentration was 1% (based on 100% activity). The emulsifying composition was heated to 130° F., while the asphalt was liquefied at 260–270° F. The emulsifying composition and the asphalt were combined in a recirculating Gaulin laboratory mill at a residence time of 30 seconds. After being stored overnight at 150–160° F., the resulting bituminous emulsions were evaluated according to ASTM D-244. Aggregate mixes were produced with fine graded granite (50% retained on No. 8 sieve, 50% passing No. 8 sieve and 2% passing No. 200 sieve) and evaluated. The results are listed in Table I below.

TABLE I

Evaluation of Emulsifiers based on Lignin/Nonylphenol Ethoxylate and Lignin/Fatty Amine/Nonylphenol Ethoxylate

| Emulsifier | Composition[a] (ratio: parts by weight) | % Asphalt Content | Cement[b] Mix Residue (g) | Viscosity[c] (at 77° F.) | Aggregate[d] Mixing |
|---|---|---|---|---|---|
| INDULIN W-5 | Control | 63 | 0.02 | 120 cps — | 0W 10E very good |
| INDULIN SBT | Control | 60 | 0.1 | 75 cps — | 0W 10E excellent |
| E#11 | Lignin-Tallow diamine-NPEO-55 (30:18:45) | 57 | 7.3 | 900 cps 515 sec | 1W 10E good |
| E#12 | Lignin-Tallow diamine-NPEO-55 (30:9:45) | 57 | 0.6 | 4900 cps 1200+ sec | 1W 10E fair |
| E#25 | Lignin-Tallow diamine-HCHO-NPEO-55 (30:24:2.25:60) | 60 | 0 | 1650 cps — | 2W 10E very good |
| E#26 | Lignin-Tall oil diamine-HCHO-NPEO-55 (30:36:3.6:30) | 63 | 15.3 | 180 cps — | — |
| E#27 | Lignin-Tall oil diamine-HCHO-NPEO-55 (30:30:2.4:60) | 63 | — | 50,000 cps — | 2W 10E good |
| E#28 | Lignin-Tallow triamine-HCHO-NPEO-55 (30:24:2.25:30) | 60 | 0.06 | 210 cps — | — |
| E#29 | Lignin-Tallow triamine-HCHO-NPEO-55 (30:30:2.4:60) | 63 | 0.75 | 19,000 cps — | — |
| E#30 | Lignin-Tallow tetramine-HCHO-NPEO-55 (30:36:3.6:30) | 63 | 0.2 | 180 cps — | — |
| E#31 | Lignin-Soya diamine-HCHO-NPEO-55 (30:24:2.25:45) | 60 | 1.02 | 575 cps — | 3W 10E very good |
| E#32 | Lignin-C13/C15 alkyl diamine-HCHO-NPEO-55 (30:24:2.25:45) | 60 | 0.06 | 2750 cps — | 2W 10E excellent |

[a] INDULIN SBT and INDULIN W-5 are slow-set emulsifiers commercially available from Westvaco Corporation.
HCHO: formaldehyde.
NPEO-55: nonylphenol ethoxylate (55 moles ethylene oxide).
[b] ASTM D-244: a value lower than 1.0 g residue indicates slow-set emulsions.
[c] Brookfield model LVT, spindle 2, 0.3 rpm and Sayboldt Furol in seconds;
[d] Parts per 100 g aggregate (granite 50% retained on No. 8 sieve, 50% passing No. 8 sieve) of W (water) and E (emulsion).
Percentage coating of the aggregate by the asphalt:
excellent - above 95%
very good - 90–95%
good - 80–90%
fair - below 80%

The results noted in Table I clearly show the efficiency and improvement of the methods employing the new emulsifying composition combinations when compared to two cationic slow-set emulsifiers which are commonly used in the industry. Bituminous emulsions with significantly higher viscosities are obtained via utilization of the enhanced emulsifying compositions when compared to the standard commercial emulsifiers.

EXAMPLE 6

This example illustrates the invention methods utilizing the above noted emulsifying compositions. Using PINE BEND 120/150 penetration asphalt (commercially available from Koch Materials, Inc.), emulsions were prepared at 40–60% asphalt residue at a pH of about 2.0 following the method described in Example 4. The bituminous emulsions produced were subsequently evaluated using the procedures described in Example 4, and the results are listed in Table II below.

TABLE II

Evaluation of Emulsifiers based on Lignin/Nonylphenol Ethoxylate and Lignin/Fatty Polyamine/Nonylphenol Ethoxylate Blends.

| Emulsifier | Composition[a] (ratio: parts by weight) | % Asphalt Content | Cement[b] Mix Residue (grams) | Viscosity[c] (at 77° F.) | Aggregate[d] Mixing |
|---|---|---|---|---|---|
| Redicote E-5 | Control | 55 | 0.09 | 70 cps 17.3 sec | 1W 10E excellent |
| Redicote E-11 | Control | 55 | 0.13 | 80 cps 13.7 sec | 1W 10E excellent |
| Redicote E-4868 | Control | 55 | 0.13 | 35 cps 15.5 sec | 1W 10 E excellent |
| INDULIN SBT | Control | 62 | 0 | — 18.3 sec | 1W 10E excellent |
| INDULIN W-5 | Control | 62 | 0 | — 19.0 sec | 1W 10E excellent |
| E#1 | Lignin-NPEO-55 (30:30) | 55 | 0 | — 12.8 sec | 0W 10E excellent |
| E#2 | Hardwood Lignin-NPEO-55 (30:45) | 57 | 0 | 72 cps 18.6 sec | 0W 10E fair |
| E#13 | Lignin-Tallow diamine-NPEO-55 (30:21:45) | 55 | 0 | — 115 sec | 0W 10E excellent |
| E#14 | Lignin-Tallow diamine-NPEO-55 (30:15:45) | 55 | 0.07 | — 115 sec | 0W 10E very good |
| E#15 | Hardwood Lignin-Tallow diamine-NPEO-55 (30:18:45) | 57 | 0 | 80 cps 21.3 sec | 0W 10E fair |
| Redicote E-5 | Control | 55 | 0.09 | 70 cps 17.3 sec | 1W 10E excellent |
| E#16 | Hardwood Lignin-Tallow diamine-NPEO-55 (30:24:45) | 57 | 4.2 | 72 cps 23.5 sec | — |
| E#17 | Hardwood Lignin-Tallow diamine-NPEO-55 (30:30:45) | 57 | 9.8 | 80 cps 15.1 sec | — |

TABLE II-continued

Evaluation of Emulsifiers based on Lignin/Nonylphenol Ethoxylate and Lignin/Fatty Polyamine/Nonylphenol Ethoxylate Blends.

| Emulsifier | Composition[a] (ratio: parts by weight) | % Asphalt Content | Cement[b] Mix Residue (grams) | Viscosity[c] (at 77° F.) | Aggregate[d] Mixing |
|---|---|---|---|---|---|
| E#36 | Lignin-Tallow Diamine-HCHO-NPEO-55 (30:24:2.25:45) | 55 | 1.35 | 270 cps 240 sec | 1W 10E excellent |

[a]REDICOTE E-11, E-5, and E-4868 are slow-set emulsifiers commercially available from Akzo-Nobel Incorporated.
INDULIN SBT and INDULIN W-5 are slow-set emulsifiers commercially available from Westvaco Corporation.
[b]ASTM D-244: a value lower than 1.0 g residue indicates slow-set emulsions.
[c]Brookfield model LVT, spindle 2, 0.3 rpm and Sayboldt Furol in seconds;
[d]Parts per 100 g aggregate (granite 50% retained on No. 8 sieve, 50% passing No. 8 sieve) of W (water) and E (emulsion).
Percentage coating of the aggregate by the asphalt:
excellent - above 95%
very good - 90–95%
good - 80–90%
fair - below 80%

The data noted in Table II clearly demonstrates the efficiency of the methods employing the new emulsifying composition combination when compared to commercially available cationic slow-set emulsifiers. Bituminous emulsions with significantly higher viscosities are obtained via utilization of the enhanced emulsifying compositions when compared to the standard commercial emulsifiers.

EXAMPLE 7

This example shows the unexpected behavior of lignin in the presence of nonylphenol ethoxylate at low pH value. Generally, kraft lignin precipitates at pH of 7 and lower when no cosurfactant is present. However, in combination with sufficient nonylphenol ethoxylate (exhibiting a polyethylene oxide chain prepared by the condensation of 30 to 100 moles ethylene oxide per mole of nonylphenol) lignin stays in solution and forms a homogeneous soap solution at low pH. The same is true for combinations of the components plus a third ingredient such a tallow amine. Certain ethoxylated tallow amines and diamines are able to replace nonylphenol ethoxylate, and clear solutions of lignin at low pH values are obtained when these surfactants are present. Table III summarizes this behavior.

TABLE III

Solubility of Lignin/Nonylphenol Ethoxylate and Lignin/Nonylphenol Ethoxylate/Tallow Diamine Combinations at High and Low pH Values

| Emulsifier | Composition[a] (ratio: parts by weight) | At 35% solids and pH 11 | At 7% solids and pH 2 |
|---|---|---|---|
| E#3 | Lignin-NPEO-55 (1:0.5) | homogeneous | lignin precipitates |
| E#4 | Lignin-NPEO-55 (1:0.75) | homogeneous | turbid |
| E#5 | Lignin-NPEO-55 (1:1) | homogeneous | turbid |
| E#6 | Lignin-NPEO-55 (1:1.5) | homogeneous | slightly turbid |
| E#7 | Lignin-NPEO-55 (1:2) | homogeneous | clear |
| E#8 | Lignin-NPEO-100 (1:1) | homogeneous | slightly turbid |
| E#9 | Lignin-NPEO-100 (1:1.5) | homogeneous | clear |
| E#10 | Lignin-Tallow diamine-NPEO-55 (1:0.2:1.5) | homogeneous | clear |
| E#33 | Lignin-HCHO-NPEO-55[b] (1:0.075:0.75) | homogeneous | slightly turbid |
| Control | Lignin-tallow amine (10)-ethoxylate | homogeneous | clear |

[a]NPEO-55: nonylphenol ethoxylate (55 moles ethylene oxide).
NPEO-100: nonylphenol ethoxylate (100 moles ethylene oxide),.
HCHO: formaldehyde.
Tallow amine (10) ethoxylate: tallow amine reacted with 10 moles ethylene oxide.
[b]Lignin reacted with formaldehyde at a weight ratio of 1:0.75.

This example shows the hydrotroping properties of nonylphenol ethoxylate for unmodified lignin in acidic solutions. Generally, only sulfonated or aminated lignins are soluble at low pH values without the presence of an additive.

EXAMPLE 8

To 50–90 grams (based on 100% activity) of the lignin/nonylphenol ethoxylate mixtures produced in Example 1 was added from 2–30 grams of tallow amine, tallow triamine, tallow tetramine, or tallow pentamine. These blends were diluted with water to about 35% solids and heated for two hours at 80° C. to produce enhanced emulsifying compositions. These emulsifying compositions were used to produce and evaluate bituminous emulsion via the procedures noted in Example 4 above. Bituminous emulsions with significantly higher viscosities are obtained via utilization of the enhanced emulsifying compositions when compared to the standard commercial emulsifiers.

EXAMPLE 9

To 50–90 grams (based on 100% activity) of the lignin/nonylphenol ethoxylate mixtures produced in Example 1 was added from 2–30 grams of oleyl diamine, coco diamine, soya diamine or petroleum-derived diamine. These blends were diluted with water to about 35% solids and heated for two hours at 80° C. to produce enhanced emulsifying compositions. These emulsifying compositions were used to produce and evaluate bituminous emulsion via the procedures noted in Example 4 above. Bituminous emulsions with significantly higher viscosities are obtained via utilization of the enhanced emulsifying compositions when compared to the standard commercial emulsifiers.

It is clear from the examples shown above that the novel cationic medium-set and slow-set emulsifying compositions taught herein achieved superior results when compared to conventional cationic medium-set and slow-set emulsifiers.

Many modifications and variations of the present inventions will be apparent to one skilled in the art in light of the above teaching. It is understood therefore that the scope of the invention is not to be limited by the foregoing description, but rather is to be defined by the claims appended hereto.

What is claimed is:

1. An emulsifying composition for use in producing solventless slow-set and medium-set cationic bituminous emulsions comprising a blend, prepared at pH levels greater than about 10, of:

A) 100 parts by weight of lignin,

B) 75 to 200 parts by weight of a nonionic surfactant, and

C) 20 to 100 parts by weight of a fatty amine selected from the group consisting of N-alkyl amine, N-alkyl-propane diamine-1.3, N-alkyl-N'-propyl amino-propane diamine-1.3, N-alkyl-N',N'-bis-propyl amino-propane diamine-1.3, N-alkyl-N,N',N'-tri-propyl amino-propane diamine-1.3, and combinations thereof.

2. The composition of claim 1 wherein the lignin is a member selected from the group consisting of kraft soft wood lignin, kraft hardwood lignin, bagasse lignin, organosol lignin, desulfonated lignosulfonate, and combinations thereof.

3. The composition of claim 1 wherein the nonionic surfactant is a member selected from the group consisting of nonylphenol ethoxylates exhibiting a chain length of 30 to 100 ethylene oxide units, linear $C_8$–$C_{18}$ ethoxylated fatty alcohols, branched $C_8$–$C_{18}$ ethoxylated fatty alcohols, ethylene oxide propylene oxide block copolymers having a number average molecular weight in the range of about 1,000 to about 10,000, polyethoxylated tallow amine containing 5 to 50 ethylene oxide units per molecule, polyethoxylated tallow diamine containing 5 to 50 ethylene oxide units per molecule, and combinations thereof.

4. The composition of claim 1 wherein the fatty amine contains a $C_8$ to $C_{22}$ alkyl residue.

5. The composition of claim 1 wherein the fatty amine is a member selected from the group consisting of tallow amine, tallow diamine, soya diamine, tall oil diamine, tallow triamine, tallow tetramine, oleyl diamine, coco diamine, linear $C_8$–$C_{18}$ petroleum-derived diamine, branched $C_8$–$C_{18}$ petroleum-derived diamine, linear $C_{12}$–$C_{18}$ alkylether diamine, branched $C_{12}$–$C_8$ alkylether diamine, and combinations thereof.

6. The composition of claim 1 wherein the pH level is about 10.5 to about 12.5.

7. An improved method for enhancing emulsion viscosity in solventless slow-set and medium-set cationic bituminous emulsions, wherein the improvement comprises the addition to the emulsion of a composition comprising a blend, prepared at pH levels greater than about 10, of:

A) 100 parts by weight of lignin,

B) 75 to 200 parts by weight of a nonionic surfactant, and

C) 20 to 100 parts by weight of a fatty amine selected from the group consisting of N-alkyl amine, N-alkyl-propane diamine-1.3, N-alkyl-N'-propyl amino-propane diamine-1.3, N-alkyl-N',N'-bis-propyl amino-propane diamine-1.3, N-alkyl-N,N',N'-tri-propyl amino-propane diamine-1.3, and combinations thereof;

wherein the composition is acidified to a pH level of about 1.5 to about 4.0 prior to its addition to the emulsion.

8. The method of claim 7 wherein the lignin is a member selected from the group consisting of kraft soft wood lignin, kraft hardwood lignin, bagasse lignin, organosol lignin, desulfonated lignosulfonate, and combinations thereof.

9. The composition of claim 7 wherein the nonionic surfactant is a member selected from the group consisting of nonylphenol ethoxylates exhibiting a chain length of 30 to 100 ethylene oxide units, linear $C_8$–$C_{18}$ ethoxylated fatty alcohols, branched $C_8$–$C_{18}$ ethoxylated fatty alcohols, ethylene oxide propylene oxide block copolymers having a number average molecular weight in the range of about 1,000 to about 10,000, polyethoxylated tallow amine containing 5 to 50 ethylene oxide units per molecule, polyethoxylated tallow diamine containing 5 to 50 ethylene oxide units per molecule, and combinations thereof.

10. The method of claim 7 wherein the fatty amine is a member selected from the group consisting of tallow amine, tallow diamine, soya diamine, tall oil diamine, tallow triamine, tallow tetramine, oleyl diamine, coco diamine, linear $C_8$–$C_{18}$ petroleum-derived diamine, branched $C_8$–$C_{18}$ petroleum-derived diamine, linear $C_{12}$–$C_{18}$ alkylether diamine, branched $C_{12}$–$C_{18}$ alkylether diamine, and combinations thereof.

11. The method of claim 7 wherein the composition is prepared at a pH level of about 10.5 to about 12.5.

12. An emulsifying composition for use in producing solventless slow-set and medium-set cationic bituminous emulsions comprising a blend, prepared at pH levels greater than about 10, of:

A) 100 parts by weight of lignin,

B) 75 to 200 parts by weight of a nonionic surfactant, and

C) 20 to 100 parts by weight of a fatty amine selected from the group consisting of N-alkyl amine, N-alkyl-propane diamine-1.3, N-alkyl-N'-propyl amino-propane diamine-1.3, N-alkyl-N',N'-bis-propyl amino-propane diamine 1.3, N-alkyl-N,N',N'-tri-propyl amino-propane diamine-1.3, and combinations thereof;

wherein this mixture is reacted in an addition reaction with

D) 1.5 to 9.0 parts by weight of formaldehyde to produce the emulsifying composition.

13. The composition of claim 12 wherein the lignin is a member selected from the group consisting of kraft soft wood lignin, kraft hardwood lignins, bagasse lignins, organosol lignins, desulfonated lignosulfonates, and combinations thereof.

14. The composition of claim 12 wherein the nonionic surfactant is a member selected from the group consisting of nonylphenol ethoxylates exhibiting a chain length of 30 to 100 ethylene oxide units, linear $C_8$–$C_{18}$ ethoxylated fatty alcohols, branched $C_8$–$C_{18}$ ethoxylated fatty alcohols, ethylene oxide propylene oxide block copolymers having a number average molecular weight in the range of about 1,000 to about 10,000, polyethoxylated tallow amine containing 5 to 50 ethylene oxide units per molecule, polyethoxylated tallow diamine containing 5 to 50 ethylene oxide units per molecule, and combinations thereof.

15. The composition of claim 12 wherein the fatty amine is a member selected from the group consisting of tallow diamine, soya diamine, tall oil diamine, tallow triamine, tallow tetramine, oleyl diamine, coco diamine, linear $C_8$–$C_{18}$ petroleum-derived diamine, branched $C_8$–$C_{18}$ petroleum-derived diamine, linear $C_{12}$–$C_{18}$ alkylether diamine, branched $C_{12}$–$C_{18}$ alkylether diamine, and combinations thereof.

16. The composition of claim 12 wherein the pH level is about 10.5 to 11.5.

17. An improved method for enhancing emulsion viscosity in solventless slow-set and medium-set cationic bituminous emulsions, wherein the improvement comprises the addition to the emulsion of an emulsifying composition comprising a blend, prepared at pH levels greater than about 10, of:

A) 100 parts by weight of lignin,

B) 75 to 200 parts by weight of a nonionic surfactant, and

C) 20 to 100 parts by weight of a fatty amine selected from the group consisting of N-alkyl amine, N-alkylpropane diamine-1.3, N-alkyl-N'-propyl amino-propane diamine-1.3, N-alkyl-N',N'-bis-propyl amino-propane diamine-1.3, N-alkyl-N,N',N'-tri-propyl amino-propane diamine 1.3, and combinations thereof; wherein this mixture is reacted in an addition reaction with D) 1.5 to 9.0 parts by weight of formaldehyde to produce the emulsifying composition; and wherein the emulsifying composition is acidified to a pH level of about 1.5 to about 4.0 prior to its addition to the emulsion.

18. The method of claim 17 wherein the lignin is a member selected from the group consisting of kraft soft wood lignin, kraft hardwood lignin, bagasse lignin, organosol lignin, desulfonated lignosulfonate, and combinations thereof.

19. The composition of claim 17 wherein the nonionic surfactant is a member selected from the group consisting of nonylphenol ethoxylates exhibiting a chain length of 30 to 100 ethylene oxide units, linear $C_8$–$C_{18}$ ethoxylated fatty alcohols, branched $C_8$–$C_{18}$ ethoxylated fatty alcohols, ethylene oxide propylene oxide block copolymers having a number average molecular weight in the range of about 1,000 to about 10,000, polyethoxylated tallow amine containing 5 to 50 ethylene oxide units per molecule, polyethoxylated tallow diamine containing 5 to 50 ethylene oxide units per molecule, and combinations thereof.

20. The method of claim 17 wherein the fatty amine is a member selected from the group consisting of tallow diamine, soya diamine, tall oil diamine, tallow triamine, tallow tetramine, oleyl diamine, coco diamine, linear $C_8$–$C_{18}$ petroleum-derived diamine, branched $C_8$–$C_{18}$ petroleum-derived diamine, linear $C_{12}$–$C_{18}$ alkylether diamine, branched $C_{12}$–$C_{18}$ alkylether diamine, and combinations thereof.

21. The method of claim 17 wherein the composition is prepared at a pH level of about 10.5 to about 12.5.

* * * * *

UNITED STATES PATENT AND TRADEMARK OFFICE
CERTIFICATE OF CORRECTION

PATENT NO. : 6,077,888
DATED : June 20, 2000
INVENTOR(S) : Peter Schilling

It is certified that error appears in the above-identified patent and that said Letters Patent is hereby corrected as shown below:

On the Title Page, 2nd column, Attorney, Agent or Firm:

Delete "McDaniels" and substitute therefor --McDaniel--.

In column 11, line 39, claim 5, delete "$C_8$" and substitute therefor --$C_{18}$--.

Signed and Sealed this

Twenty-fourth Day of April, 2001

Attest:

NICHOLAS P. GODICI

*Attesting Officer*      *Acting Director of the United States Patent and Trademark Office*